US007860086B2

(12) United States Patent
Pruecklmayer

(10) Patent No.: US 7,860,086 B2
(45) Date of Patent: Dec. 28, 2010

(54) METHOD AND APPARATUS FOR VOICE DATA PACKETS

(75) Inventor: Stephan H. Pruecklmayer, Hohenkirchen-Siegertsbrunn (DE)

(73) Assignee: Lantiq Deutschland GmbH, Neubiberg (DE)

( * ) Notice: Subject to any disclaimer, the term of this patent is extended or adjusted under 35 U.S.C. 154(b) by 853 days.

(21) Appl. No.: 11/041,430

(22) Filed: Jan. 24, 2005

(65) Prior Publication Data

US 2005/0169317 A1  Aug. 4, 2005

(30) Foreign Application Priority Data

Jan. 30, 2004  (DE) .................. 10 2004 004 878

(51) Int. Cl.
  *H04L 12/50* (2006.01)
  *H04L 12/40* (2006.01)
  *H04L 12/43* (2006.01)
(52) U.S. Cl. .................. 370/364; 370/438; 370/458
(58) Field of Classification Search ................ 370/352, 370/401, 402, 400, 364, 431, 438, 498
  See application file for complete search history.

(56) References Cited

U.S. PATENT DOCUMENTS 4,689,788 A * 8/1987 Wurzburg et al. .......... 370/365
4,914,650 A * 4/1990 Sriram ...................... 370/235
6,154,465 A * 11/2000 Pickett ...................... 370/466
6,240,084 B1 * 5/2001 Oran et al. ................. 370/352
6,259,691 B1 * 7/2001 Naudus ..................... 370/352
6,327,259 B1 * 12/2001 Chiu et al. ................. 370/375
6,560,196 B1   5/2003 Wei
7,116,683 B1 * 10/2006 Petersen et al. ............ 370/474
2002/0065063 A1 * 5/2002 Uhlik et al. ................ 455/404

FOREIGN PATENT DOCUMENTS

WO   WO 97/44740      11/1997
WO   WO 03/081942 A1  10/2003

OTHER PUBLICATIONS

German Office Action dated Sep. 27, 2004.
The ATM Forum Technical Committee, "UTOPIA 3 Physical Layer Interface," af-phy-0136.000, Nov. 1999.
German Office Action dated Dec. 16, 2005.

* cited by examiner

*Primary Examiner*—Chirag G Shah
*Assistant Examiner*—Nima Mahmoudzadeh
(74) *Attorney, Agent, or Firm*—Eschweiler & Associates, LLC

(57) ABSTRACT

Data transmission method for voice data packets (SDP) between at least one voice signal processor (7-*i*) and a network processor (3) using a voice data bus (10) in time-division multiplex data frames which each have a predetermined number of timeslots (TS), where the voice data packets (SDP) from a voice signal processor (7-*i*) are transmitted in split form via the voice data bus (10) in particular timeslots provided for the respective voice signal processor (7-*i*).

19 Claims, 9 Drawing Sheets

US 7,860,086 B2

METHOD AND APPARATUS FOR VOICE DATA PACKETS

TECHNICAL FIELD

The invention relates to an apparatus and a method for transmitting voice data packets in timeslots in a time-division multiplex data frame.

BACKGROUND ART

Telephone connections which are set up via data networks are becoming increasingly important. In the field of telecommunications, there are various options for transmitting voice data in a packet data format via a data network (examples are VoIP, VoATM, VoDSL, VoCM). VoIP (voice over IP) denotes the setup of a voice connection via the Internet. Voice connections are set up by the transmitter via an analog line or an ISDN line.

FIG. 1 shows subscriber linecards for connecting a multiplicity of telephone subscribers to a data network, particularly to the Internet. Each subscriber linecard contains a network processor which is connected to the data network via a network interface (backplane). The network processor or main processor on the subscriber linecard interchanges data packets with the data network, these normally being Ethernet data packets or ATM cells.

In the case of a conventional subscriber linecard, the network processor is connected to various signal processors by means of a microcontroller interface bus. The voice signal processors are normally digital signal processors (DSP). The digital signal processors (DSP) generate signaling systems, compensate for echo signals and perform data compression operations. Each DSP processor is for its part connected to a plurality of subscriber line ports which normally have an SLIC circuit (SLIC: Subscriber Line Interface Circuit) and a CODEC for connecting a subscriber terminal. The SLIC circuit can have an analog telephone terminal connected to it directly. A splitter may additionally be used to connect a data modem. The analog voice signals received from the analog telephone terminal are converted into digital voice data by an analog/digital converter provided in the subscriber port. Conversely, the voice data provided for the subscriber by the DSP processor are converted into an analog voice signal by a digital/analog converter within the subscriber port and are sent to the analog telephone terminal by the SLIC circuit.

The number of digital signal processors (DSP) on a subscriber linecard differs, in the same way as the number of subscriber line ports provided for each digital processor. In the case of conventional subscriber linecards, the number of subscriber line ports is approximately 4-64 subscriber line ports on one subscriber linecard.

Each subscriber linecard is provided with precisely one network processor or controller which is normally connected to a plurality of signal processors (DSP) by means of the common microcontroller interface bus. In the case of conventional Voice over IP subscriber linecards, the network processor or controller takes from the signaling in order to set up a telephone connection between subscriber terminals, i.e. analog telephone sets, which are connected to the associated SLIC circuit. In this case, the signaling is performed using signaling protocols such as SIP, MGCP, H323.

FIG. 2 is used to explain setup of a telephone connection via a data network based on the prior art. If the subscriber on the telephone terminal A wishes to set up a telephone connection to the telephone terminal B, then the digital signal processor $DSP_A$ generates a call-connected signal when the handset of telephone terminal A has been identified as having been lifted, and first of all sends the identified digits of B's telephone number which have been dialed to its own network processor A. The network processor A transmits the identified telephone number to a gatekeeper via the data network. The gatekeeper uses a stored table to translate the dialed telephone number of the telephone terminal B into an associated IP address and returns this address to the querying network processor A. At that point, the actual connection setup takes place by virtue of the network processor A sending to the identified IP address of the network processor B a request to set up a telephone connection. The telephone connection between the network processor A and the network processor B is set up using the known signaling protocols such SIP, MGCP, H323. The called subscriber's digital signal processor B uses the associated port of subscriber B to generate a ringtone for the telephone terminal B. When the receiver of the analog telephone B has been lifted, the telephone connection between the two subscribers A, B has been set up.

The voice data are interchanged between the two subscribers A, B via the data network using Voice over IP data packets. FIG. 3 shows the structure of a Voice over IP data packet based on the prior art. An IP data field contains the network addresses of the respective transmitting network processor, for example the network processor A, and the network address of the received network processor, for example the network address of the network processor B. Upon a telephone call, Voice Over IP data packets are interchanged between the two subscribers in both directions simultaneously via the data network. The IP data packet is also provided with a UDP data field (UDP: User Datagram Protocol) and an RTP (Real Time Protocol) data field. The voice data form the payload of the data packet. The length of the data packets is configurable, the duration of the data packet typically being between 5 and 30 ms. The length of the data packets is limited, since the voice data have to be interchanged between the two subscribers in real time, i.e. the time delay must not be excessively long so that it is not perceived as a disruption by the two subscribers involved in the call.

The subscriber linecard based on the prior art which is shown in FIG. 1 has the following drawbacks: The microcontroller interface bus which connects the digital signal processors DSP to the network processor is used to transmit both the signaling data for telephone connections between the telephone terminals and the voice data for the telephone connections which have already been set up. The greater the number of voice signal processors (DSP) which can be integrated on a subscriber linecard and the number of subscriber line ports connected thereto, the lower the hardware costs per subscriber, since the network processor and the network processor interface and also other integrated circuits on the subscriber linecard, such as SDRAM, flash memory, PowerIC, need to be fitted on the subscriber linecard regardless of the number of subscriber line ports provided. As the number of subscriber line ports on the subscriber linecard increases, the data throughput rate on the microcontroller interface bus increases greatly, since the microcontroller interface bus is used to interchange both the signaling data for telephone connections which are to be set up and the voice data for already existing telephone connections between the digital signal processors and the network processor. The microcontroller interface bus therefore forms a bottleneck which severely limits the number of subscriber line ports which can be provided on a subscriber linecard.

FIG. 4 serves to explain this problem scenario. The data throughput rate (DS) and the time delay (V) are plotted schematically on the basis of the number of subscriber line ports provided on the subscriber linecard. The maximum data throughput rate ($DS_{max}$) is prescribed by the bus width of the microcontroller interface bus, by the bus clock frequency and by the processing speed of the network processor. The maximum permissible time delay ($V_{max}$) is obtained from the real-time condition of a telephone call and corresponds approximately to the length of a Voice over IP data packet, typically between 5 and 30 ms. As the number of active subscriber line ports increases, the data throughput DS and the time delay (V) increase, as shown in FIG. 4. In this context, the time delay arrives relatively soon at the maximum permissible delay time $V_{max}$ and thus limits the number of maximum permissible subscriber line ports on the subscriber linecard. If the delay time $V_{max}$ is exceeded, this results in a loss of data, since the network processor is not delivering to the other subscriber or fetching therefrom within the maximum permissible delay time as a result of the Voice over IP data packet. The greatly limited number of permissible number of subscriber line ports on the subscriber linecard means that the costs for the network connection increase per subscriber.

A further drawback of the subscriber linecard based on the prior art which is shown in FIG. 1 is that there is no separation between the control signals for setting up a data connection and the actual flow of data. This means that the software for the network processor is relatively complicated and it is barely possible to make deterministic predictions. The network processor can be produced only with some technical complexity on account of the many position of signaling and voice data. In this case, identifying whether the data are voice data or signaling data requires a particular identification time, which increases the signal delay time overall.

A further drawback of the conventional subscriber linecards based on the prior art can be seen in FIG. 5. When the subscriber linecard has a modular design with a plurality of subscriber modules and a network module, it is not possible to exchange a subscriber module in the course of operation. The subscriber modules are connected to the network processor by means of connectors (ST) via a common microcontroller interface bus. It is not possible to connect or disconnect a subscriber module to the microprocessor interface bus in the course of operation, i.e. there is no hot plug capability.

SUMMARY OF THE INVENTION

It is therefore the object of the present invention to provide a data transmission method for voice data packets on a subscriber linecard in which the number of additional subscriber line ports is maximized without exceeding a prescribed maximum permissible delay time for the voice data transmission.

The invention provides a data transmission method for voice data packets (SDP) between at least one voice signal processor (DSP) and a network processor using a voice data bus in time-division multiplex data frames which each have a predetermined number of timeslots (TS), where the voice data packets (SDP) from a voice signal processor (DSP) are transmitted in split form via the voice data bus in particular timeslots (TS) provided for the respective voice signal processor.

In one preferred embodiment of the inventive method, the number ($N_i$) of timeslots (TS) provided for a particular voice signal processor (DSP) within a time-division multiplex data frame is configurable.

In one preferred embodiment, a prescribed number of data bytes is transmitted in each timeslot (TS).

In one particularly preferred embodiment, each voice data packet (SDP) comprises a start flag to indicate the start of the voice data packet, voice data packet management data (header), voice signal data and an end flag to indicate the end of the voice data packet.

In one preferred embodiment, voice signal data are transmitted between the voice signal processor (DSP) and at least one subscriber port connected thereto.

In one particularly preferred embodiment, the voice signal data are buffer-stored in an associated subscriber port buffer store in the voice signal processor (DSP).

In one particularly preferred embodiment, the buffer-stored voice signal data from a subscriber port are processed by the voice signal processor (DSP).

The voice signal data received from a subscriber port and processed are packed by the voice signal processor (DSP) preferably to form voice data packets (SDP) and these voice data packets (SDP) are transmitted in split form to the network processor via the voice data bus in the timeslots (TS) provided for the voice signal processor (DSP).

The voice signal data transmitted in split form in the timeslots (TS) associated with the signal processor (DSP) are preferably compiled again in the network processor to form voice data packets (SDP).

The voice data packets (SDP) intended for the subscriber port of a voice signal processor (DSP) are transmitted in split form from the network processor to the voice signal processor (DSP) via the voice data bus preferably in the timeslots (TS) associated with the respective voice signal processor (DSP).

The voice signal data transmitted in split form to a voice signal processor (DSP) via the voice data bus using associated timeslots (TS) are preferably compiled again in the respective voice signal processor (DSP) to form voice data packets (SDP).

In one particularly preferred embodiment, the voice data bus is a PCM bus.

In one preferred embodiment, each voice signal processor is connected to the PCM bus by means of an associated PCM driver circuit.

The invention provides a subscriber linecard for connecting subscriber terminals to a data network having a network processor which is connected to the data network by means of a network interface, at least one voice signal processor (DSP) for voice signal processing, where each voice signal processor (DSP) can be connected to the subscriber terminals via subscriber ports, a control bus which is provided between the network processor and the voice signal processor and can be used to transmit control signals for setting up telephone connections between subscriber terminals, and having a voice data bus, provided between the network processor and the voice signal processors (DSP), for transmitting voice data packets (SDP), where the voice data packets (SDP) are transmitted in split form in time-division multiplex data frames which each have a predetermined number of timeslots (TS), and where timeslots intended for each voice signal processor (DSP) are provided within a time-division multiplex data frame.

In one preferred embodiment, the voice data bus is a PCM data bus.

In one particularly preferred embodiment, the voice signal processors (DSP) are connected to the PCM data bus via a PCM driver.

This affords the particular advantage that the inventive subscriber linecard can be of modular design and the subscriber modules can be exchanged in the course of operation.

In one preferred embodiment, each subscriber port has an SLIC circuit for connecting a telephone terminal.

The subscriber port preferably has an analog/digital converter for converting an analog voice signal into voice data and a digital/analog converter for converting voice data into an analog voice signal.

The data network is preferably the Internet.

The text below describes preferred embodiments of the inventive data transmission method for voice data packets and of the inventive subscriber linecard in order to explain features which are fundamental to the invention.

DETAILED DESCRIPTION OF THE INVENTION

Figure 6:
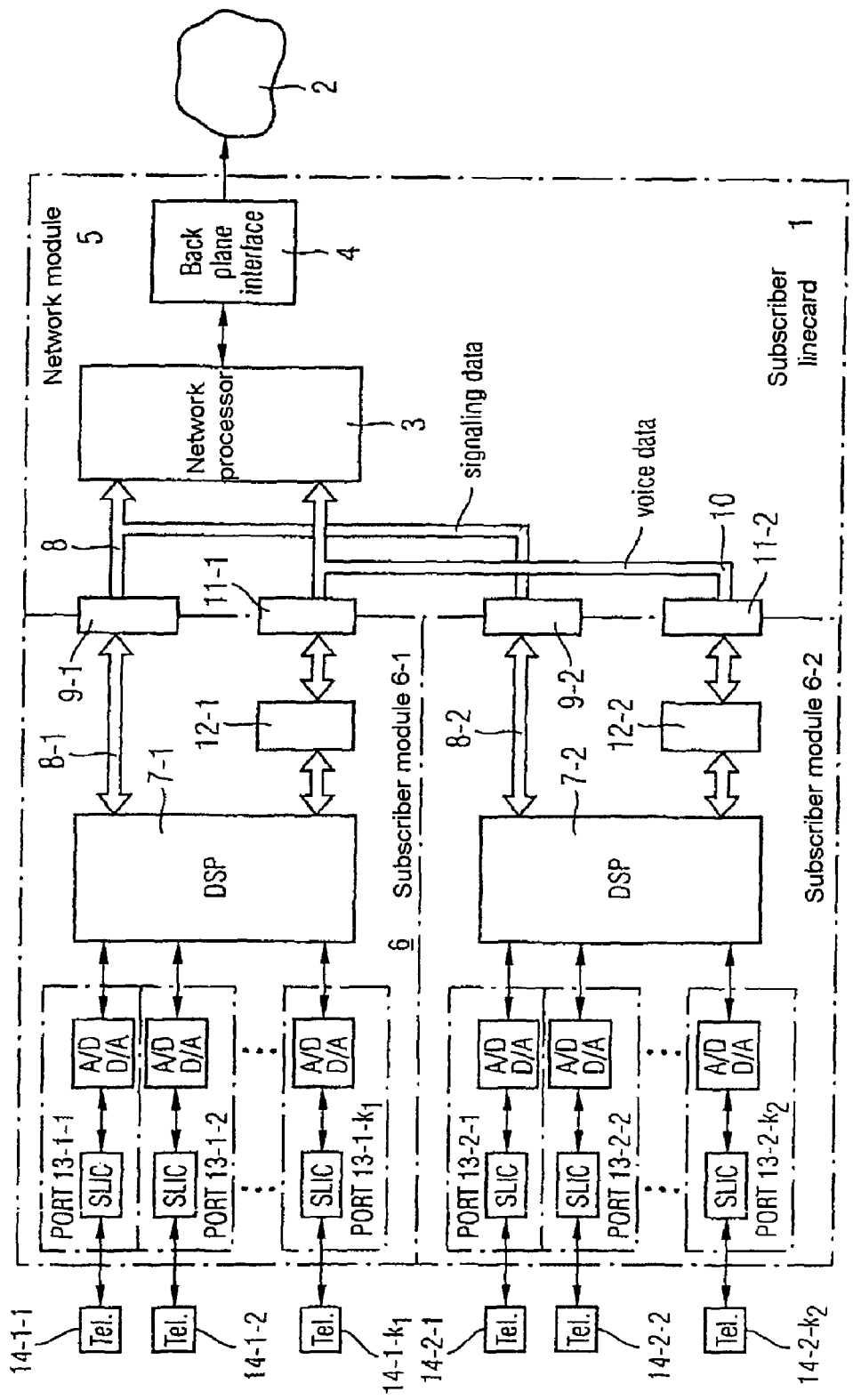
FIG. 6 shows a preferred embodiment of the inventive subscriber linecard.

FIG. 6 shows the circuit design of a preferred embodiment of the inventive subscriber linecard 1 for connecting subscriber terminals to a data network 2. The data network 2 is preferably the Internet. The subscriber linecard 1 has a network processor 3 which is connected to the data network 2 via a network interface 4. The network interface or the back plane interface 4 is used to interchange Ethernet or Utopia data packets with the data network 2.

The inventive subscriber linecard 1 is of modular design in the case of the preferred embodiment shown in FIG. 6. In this case, the subscriber linecard 1 comprises a network module 5 and a plurality of subscriber modules 6-1, 6-2. Only two subscriber modules 6-1, 6-2 are shown for the example shown in FIG. 6. In alternative embodiments, the number of subscriber modules 6-$i$ is greater. The network module 5 and the subscriber modules 6-$i$ are together one subscriber linecard 1.

Each subscriber module 6-$i$ contains a voice signal processor 7-$i$ for voice signal processing. The network processor 3 which is on the network module 5 is connected to all of the voice signal processors 7-$i$ on the subscriber linecard 1 by means of a common control bus 8. Each subscriber module 6-1 has a first plug connection 9-1 for connection to the common control bus 8. In addition, the network processor 3 in the case of the inventive subscriber linecard 1 is connected to all of the voice signal processors 7-$i$ by means of a separate voice data bus 10 using plug connections 11-$i$. Between the respective voice signal processor 7-$i$ and the associated plug connection 11-$i$ on a subscriber module 6-$i$ there is preferably a driver circuit 12-$i$. The voice data bus 10 is preferably a PCM data bus. The driver circuit 12-I is preferably a PCM data driver.

The voice signal processors 7-$i$ can for their part be connected to telephone terminals 14-$i$ via a plurality of subscriber ports 13-$i$ provided in parallel. In the example shown in FIG. 6, the voice signal processor 7-1 in the first subscriber module 6-1 is connected to K1 subscriber terminals and the voice signal processor 7-2 in the second subscriber module 6-2 is connected to K2 subscriber terminals. Each subscriber port 13 contains an SLIC circuit for connecting a telephone terminal. In addition, each subscriber port 13 has an analog/digital converter for converting an analog voice signal into voice data and a digital/analog converter for converting voice data into an analog voice signal. The voice data received from a subscriber terminal 14 via the SLIC circuit are converted into voice data by the analog/digital converter in the subscriber port 13 and are sent to the associated digital signal processor 7. Conversely, the voice data received from the digital signal processor 7 are converted into a voice signal by the digital/analog converter in the subscriber port 13 and are sent to the analog subscriber terminal 14 via the SLIC circuit.

In the case of the inventive subscriber linecard 1, the voice signal processors 7-$i$ are connected to the network processor 3 by means of two separate buses. In this arrangement, the control bus 8 is provided for the purpose of transmitting control data which serve to set up telephone connections between subscriber terminals. In the case of the inventive subscriber linecard 1, these control or signaling data are transmitted separately from the voice data on the control bus 8.

To transmit the voice data packets (SDP) between the network processor 3 and the voice signal processors 7-$i$, the invention provides an independent separate voice data bus 10. The voice data bus 10 is preferably a PCM data bus and connects a PCM interface on the network processor 3 to the PCM driver circuits 12-$i$ in the various subscriber modules 6-$i$ via the plug connections 11-$i$.

By separating the signaling data and control data from the voice data, it is possible to increase the number of active subscriber ports 13 within a subscriber linecard 1 without exceeding the maximum permissible delay time $V_{max}$. The PCM data bus 10 comprises four lines, namely an FCS line, a clock line (CLK), a data input line ($D_{in}$) for transmitting voice data starting from the network processor 3 downstream to the voice signal processors 7-$i$ and a data output line ($D_{out}$) for transmitting data starting from the digital signal processors 7-$i$ upstream to the network processor 3. In one preferred embodiment, the FSC signal has a clock frequency of 8 kHz. In this case, the data transmission lines in the PCM bus 10 ($D_{in}$, $D_{out}$) are preferably used to interchange the data between the network processor 3 and the digital signal processors 7-$i$ in timeslots (TS) of 8 bits each at a data transmission rate of 64 Kbit per second. The control bus 8 or the microcontroller interface 8 is of either serial or parallel design. In the case of a preferred serial implementation, the control bus 8 comprises merely three or four control lines.

Figure 7:
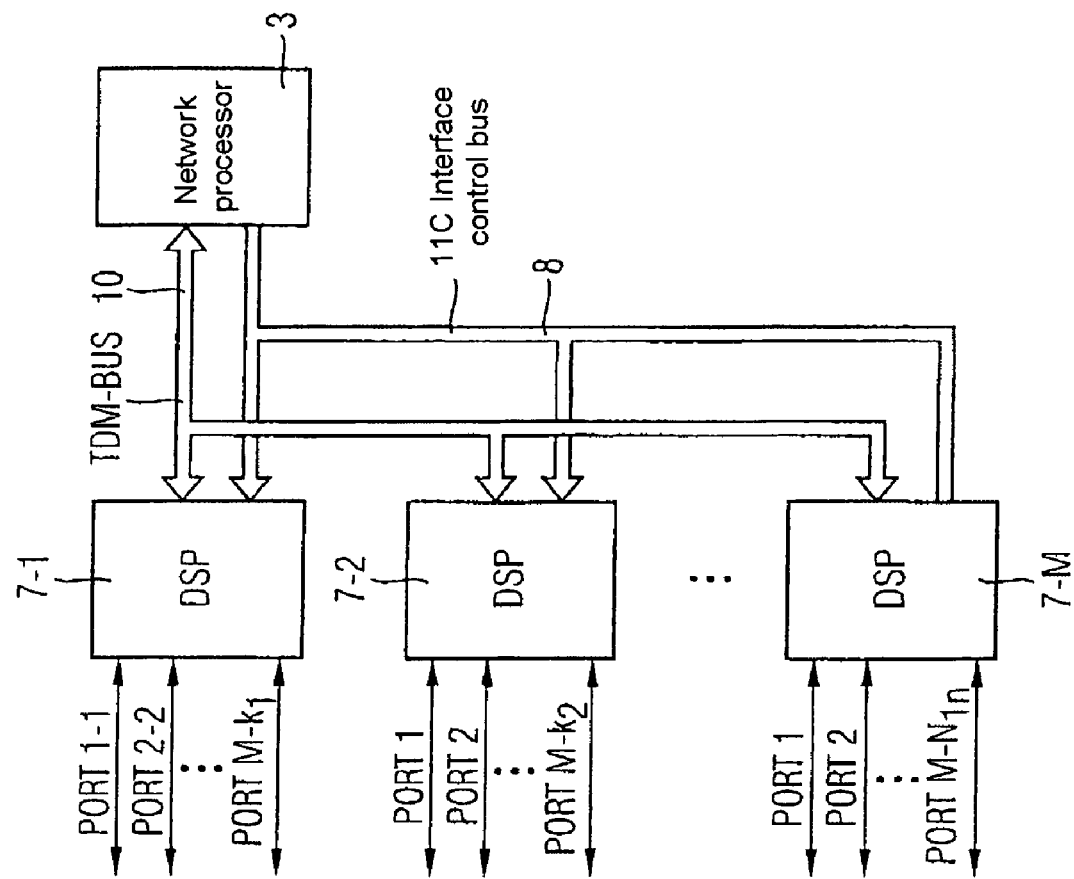
FIG. 7 shows a detail from a preferred embodiment of the inventive subscriber linecard.

FIG. 7 shows a part of the subscriber linecard 1 based on the invention. The network processor 3 is connected to M voice signal processors 7 which each have a plurality of subscriber ports. In the example shown in FIG. 7, the first signal processor 7-1 has N1 subscriber ports, the second signal processor 7-2 has N2 subscriber ports and the third signal processor has $N_M$ subscriber ports.

Figure 8:
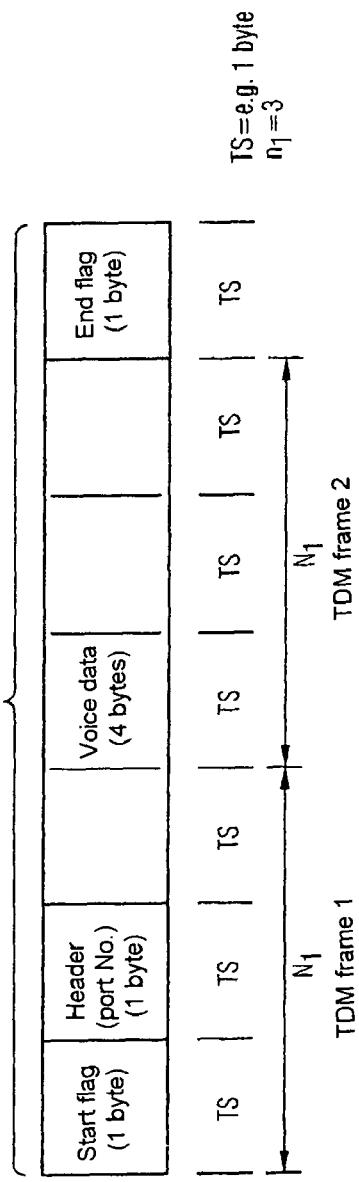
FIG. 8 shows the data structure of a voice data packet based on the invention.

FIG. 8 shows the data format of a voice data packet (SDP) which are interchanged between the voice signal processors 7-i and the network processor 3 via the voice data bus 10. In the case of the preferred embodiment shown in FIG. 8, the voice data packet (SDP) has a start flag for indicating the start of the voice data packet, header data, the actual voice data as payload and an end flag to indicate the end of the voice data packet. In the embodiment shown in FIG. 8, the header data include the port number of the subscriber port from which the voice data packet (SDP) comes or for which the voice data packet (SDP) is intended.

In the case of the example shown in FIG. 8, the start flag, the header data and the end flag each comprise one byte. In alternative embodiments, the header data include further management data for the voice data packet (SDP). In alternative embodiments, the start flag and the end flag comprise any number of bits. In alternative embodiments, the header data may be extended such that a plurality of DSPs can access the same timeslots using one bus access operation and prioritization options. The scope or volume of the voice data packed into a voice data packet (SDP) as payload is variable. The length of the voice data packet (SDP) overall must not be too great, however, so that excessive time delays do not arise which adversely affect the telephone call. In the example shown in FIG. 8, four bytes of voice data are transmitted via the voice data bus 10 in the voice data packet.

Figure 9:
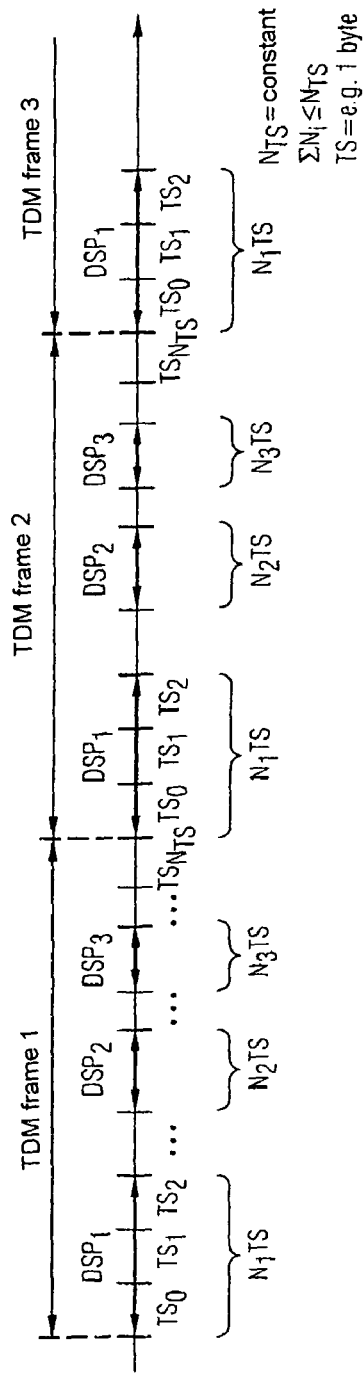
FIG. 9 shows a graph to explain the manner of operation of the inventive data transmission method for voice data packets as used in the inventive subscriber linecard.
Figure 10B:
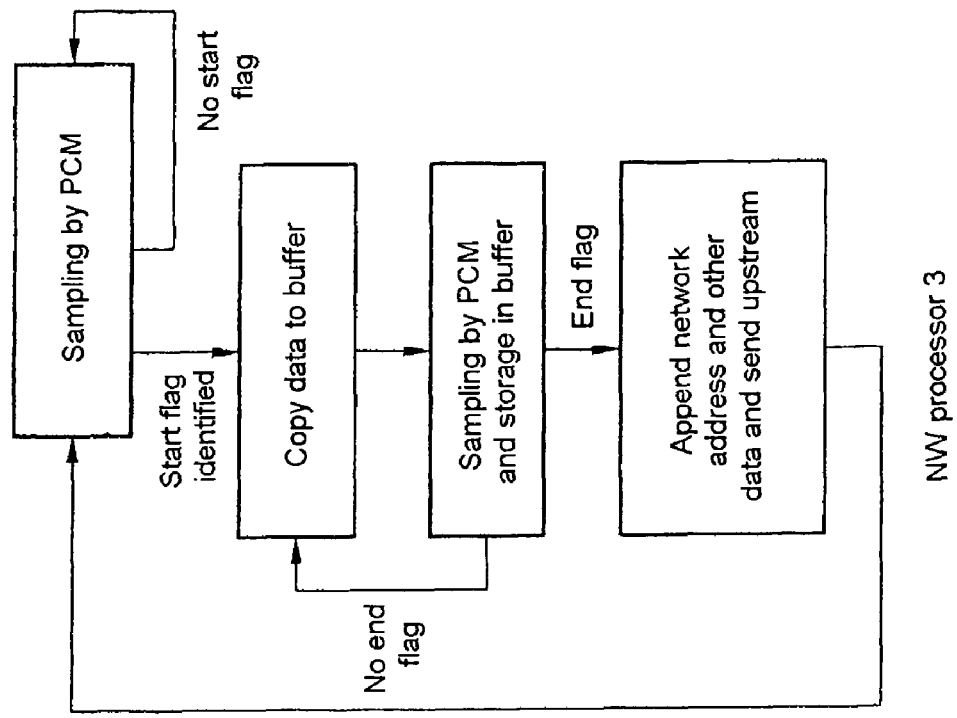
FIGS. 10a, 10b show flowcharts for the voice data packet transmission from a DSP processor to the network processor based on the invention.
Figure 10A:
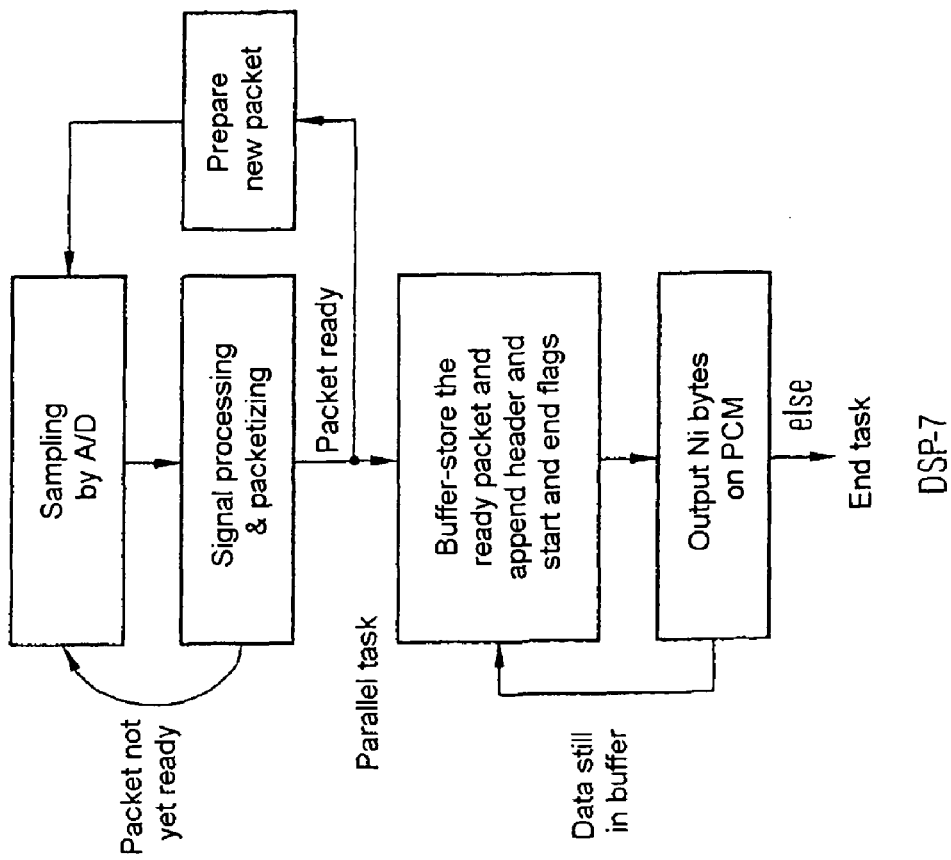
Figure 11B:
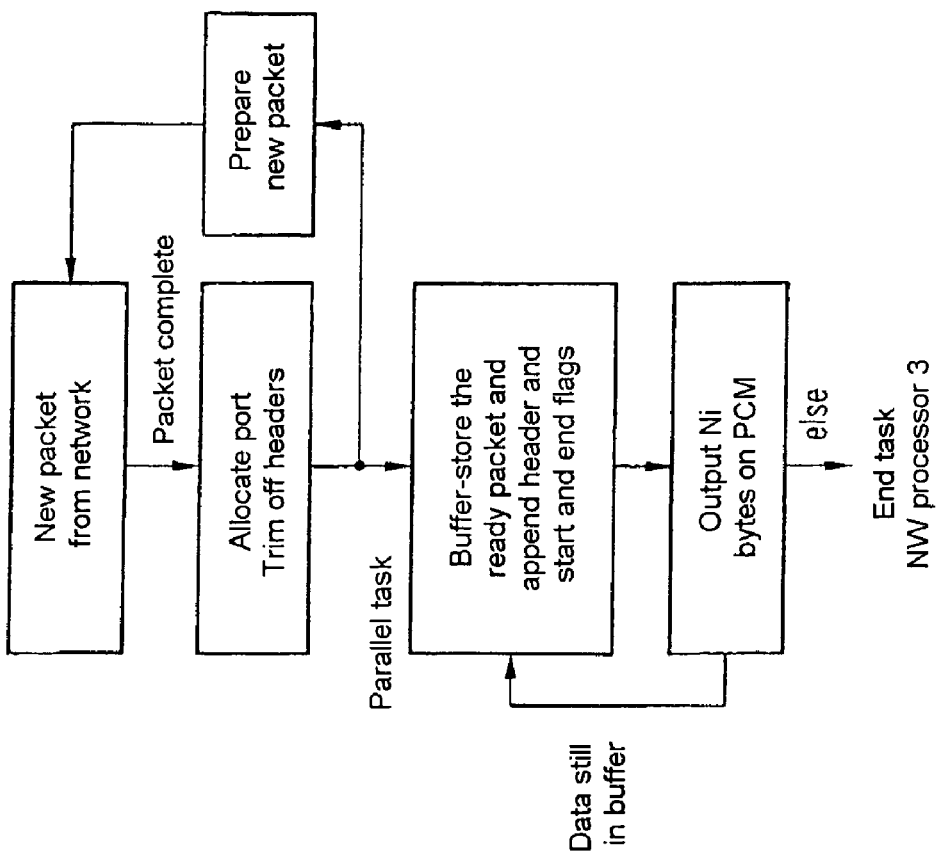
FIGS. 11a, 11b show a flowchart for the voice data packet transmission from the network processor to a DSP processor based on the invention.
Figure 11A:
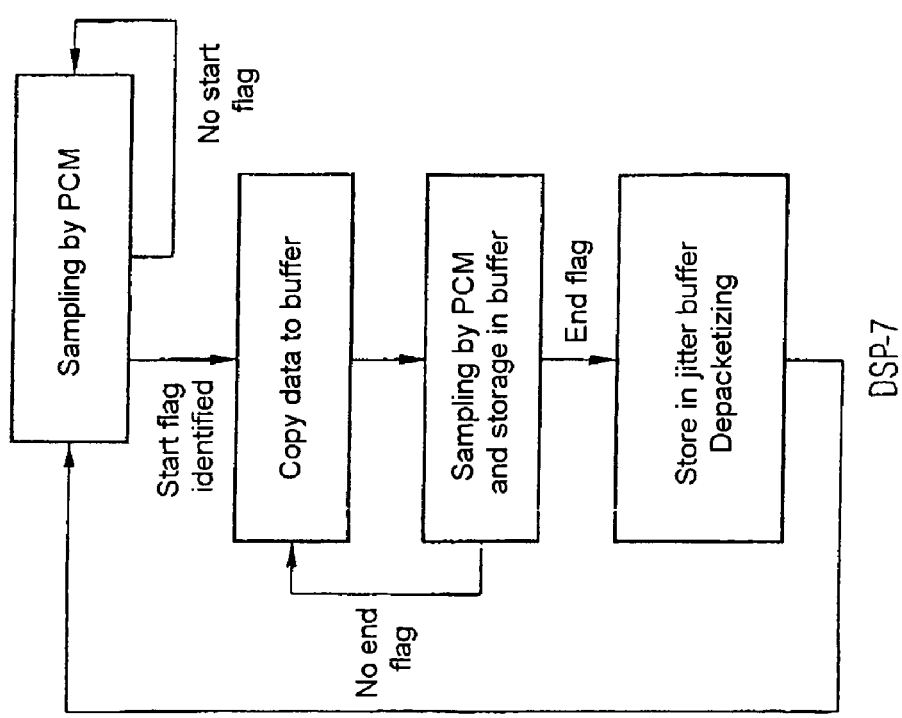

In the case of the inventive subscriber linecard 1, the voice data packets are transmitted in the time-division multiplex (TDM) time frame, as can be seen from FIG. 9, for example. A TDM frame comprises $N_{TS}$ timeslots, where each timeslot TS comprises a particular number $N_{TS}$ of bits, for example 8 bits or 16 bits. The number of timeslots TS provided in a TDM time frame is configurable and is $N_{TS}=64$, for example. Each signal processor 7 or each DSP 7 is allocated particular timeslots TS within the TDM time frame for data transmission. The allocated or provided number and positioning of the timeslots TS for a DSP processor 7-i within the TDM frame are likewise configurable. In the case of the example shown in FIG. 9, the first signal processor 7-1 has N1 allocated timeslots, the second signal processor 7-2 has N2 allocated timeslots TS and a third signal processor 7-3 has N3 allocated timeslots. The number of timeslots provided for each signal processor 7-i is freely configurable. The position of the timeslots TS which are provided within a TDM frame for a signal processor 7-i is also configurable. The TDM frame may also comprise timeslots TS which are not allocated and which can be allocated to the new signal processor 7-i when a subscriber module 6-i is plugged into the network module 5.

In the example shown, the voice data packet (SDP) shown in FIG. 8 is transmitted in timeslots TS, which each comprise one byte, via the voice data bus 10. If the voice data packet SDP comes from the first signal processor 7-1, the start flag, the port number and the first byte of the voice data are transmitted within the first TDM time frame 1, in the timeslots $TS_0$, $TS_1$, $TS_2$, i.e. in three timeslots TS which are allocated to the signal processor 7-1. The TDM time frame 2 is then used to transmit three further voice data bytes in the corresponding timeslots $TS_0$, $TS_1$, $TS_2$. Finally, the end flag of the 7-byte voice data packet (SDP) is transmitted in the TDM time frame 3 in timeslot $TS_0$.

The digital signal processors 7-1 compile the voice data packets SDP from the voice data from a port 13 which are received from the analog/digital converter by adding a start flag, the end flag and the subscriber port number to the buffer-stored voice data. The voice data packets (SDP) generated in this manner are transmitted upstream to the network processor 3 by the voice signal processors via the voice data bus 15.

Figure 1:
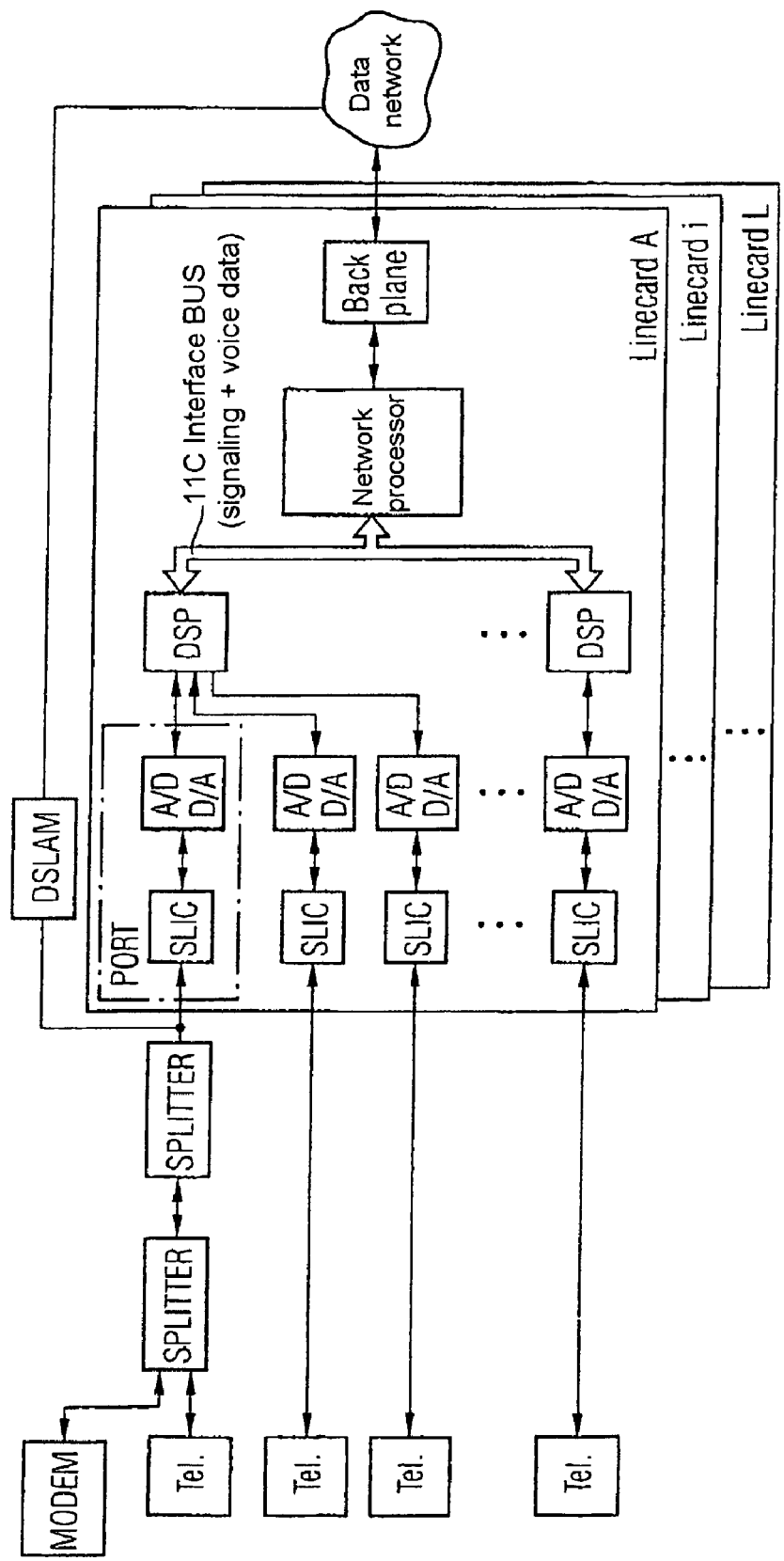
FIG. 1 shows a subscriber linecard based on the prior art.
Figure 2:
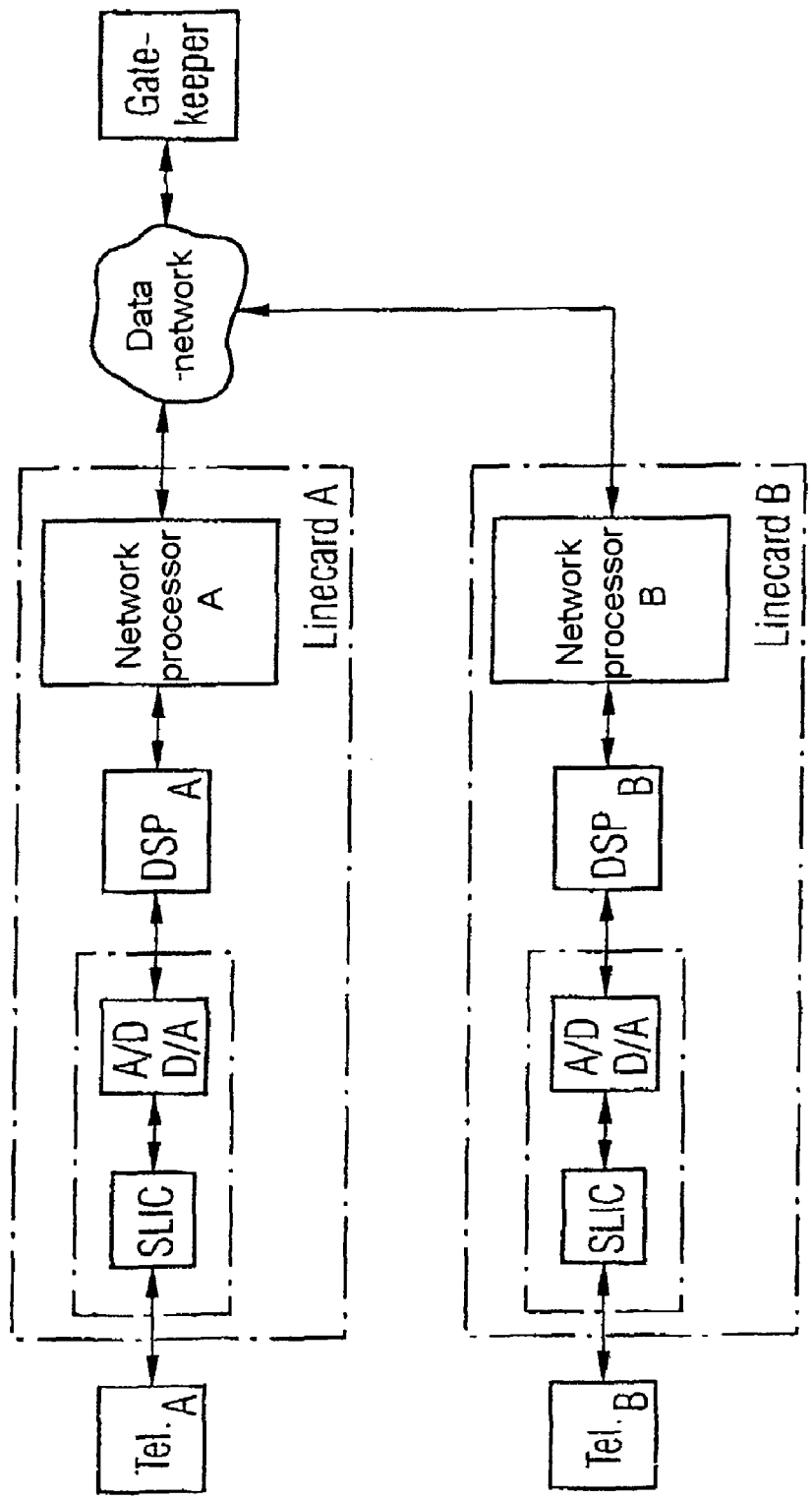
FIG. 2 shows a block diagram to explain the setup of a telephone connection from a conventional subscriber linecard.
Figure 3:
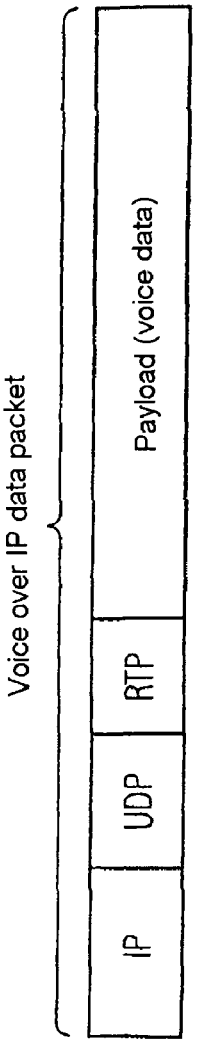
FIG. 3 shows the data structure of a Voice over IP data packet based on the prior art.
Figure 4:
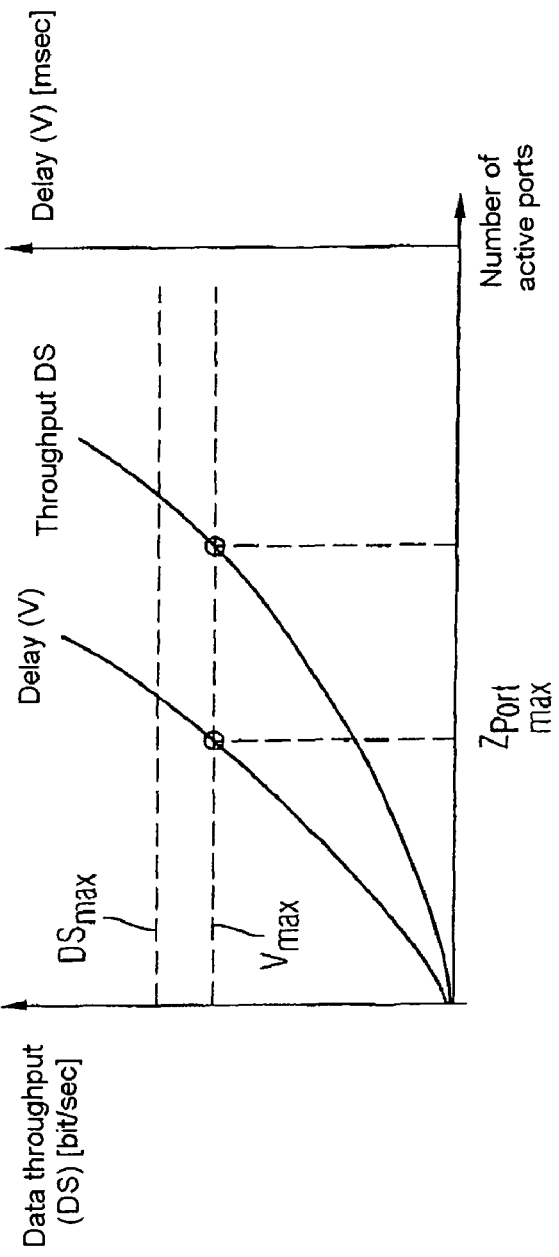
FIG. 4 shows a graph to explain the drawbacks of conventional subscriber linecards.
Figure 5:
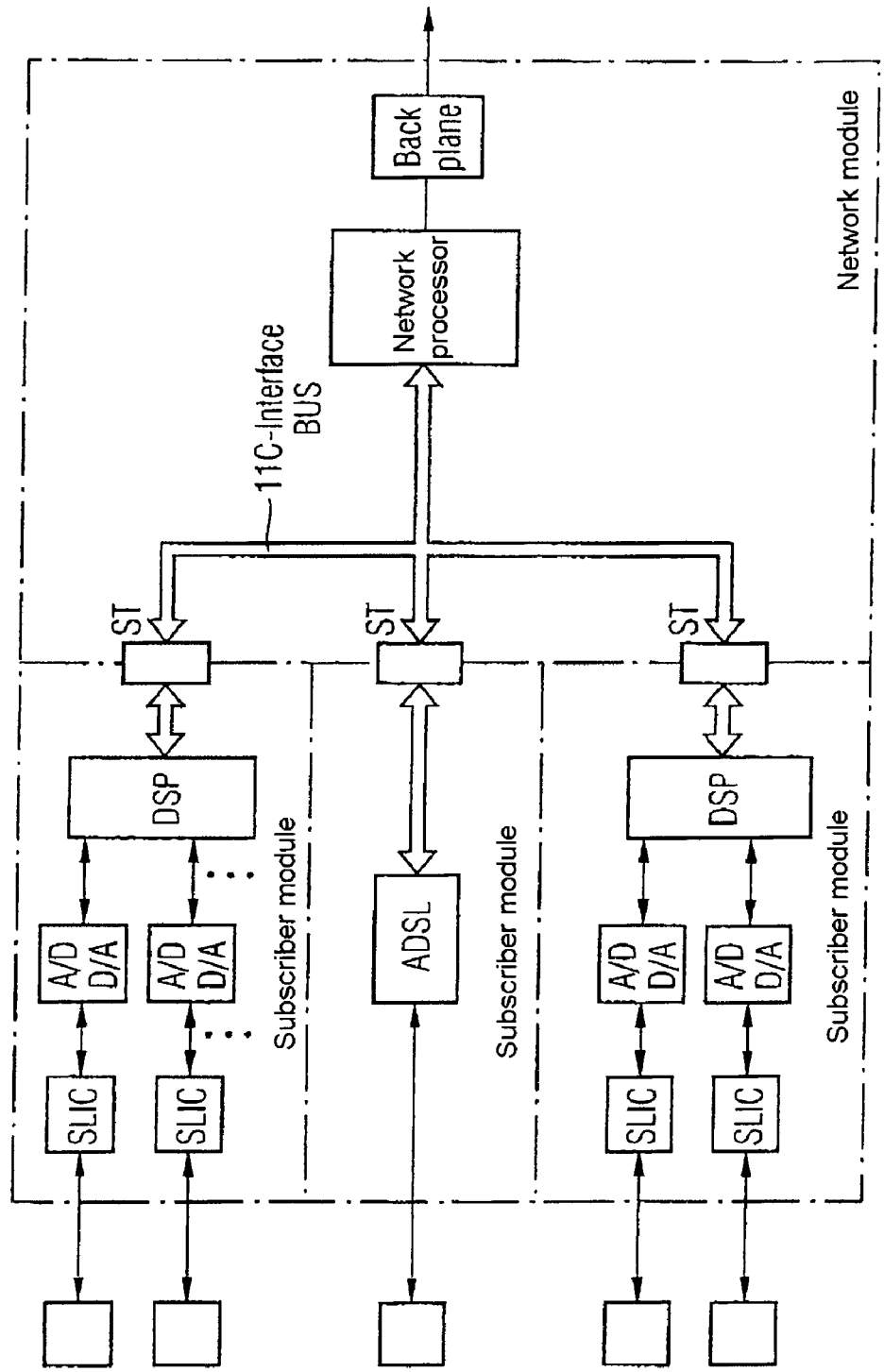
FIG. 5 shows a subscriber linecard of modular design based on the prior art.

Conversely, the network processor 3 generates the voice data packets (SDP) which are to be transmitted from the voice over IP data packets received via the network interface 4, as shown in FIG. 3.

Since the voice data are transmitted in voice data packets separately from the signaling data, the bus load on the signaling data bus is significantly reduced in comparison with conventional subscriber linecards 1, which means that the number of subscriber ports which can be fitted on a subscriber linecard 1 can be increased without infringing maximum permissible delay time $V_{max}$.

LIST OF REFERENCE SYMBOLS

1. Subscriber linecard
2. Data network
3. Network processor
4. Interface
5. Network module
6. Subscriber module
7. Digital signal processor
8. Control bus
9. Connector
10. Voice data bus
11. Connector
12. Driver
13. SLIC
14. Telephone

The invention claimed is:

1. Data transmission method for transmitting voice data packets between at least one voice signal processor and a network processor using a voice data bus in time-division multiplex data frames which each has a predetermined number of timeslots, the method comprising:
    transmitting voice signal data between the voice signal processor and at least one subscriber port connected in parallel thereto;
    transmitting the voice data packets from the at least one voice signal processor in split form distributed to multiple data frames via the voice data bus in particular timeslots provided for the at least one voice signal processor within the multiple data frames; and
    transmitting control data for setting up telephone connections between subscriber terminals between the at least one voice signal processor and the network processor via a control bus being separated from the voice data bus;
    wherein the at least one voice signal processor comprises a digital signal processor configured to generate signaling systems, compensate for echo signals and perform data compression operations and the voice data packets each comprise a payload of voice data having a variable scope or volume.

2. Method according to claim 1, wherein a number of timeslots provided for a particular voice signal processor within a time-division multiplex data frame is configurable.

3. Method according to claim 1, wherein a prescribed number of data bytes is transmitted in each timeslot.

4. Method according to claim 1, wherein each voice data packet comprises a start flag to indicate the start of the voice data packet, voice data packet management data, voice signal data and an end flag to indicate the end of the voice data packet.

5. Method according to claim 1, wherein the voice signal data from a subscriber port are buffer-stored in an associated subscriber port buffer store in the voice signal processor.

6. Method according to claim 1, wherein the voice data packets intended for a subscriber port on a voice signal processor are transmitted in split form from the network processor via the voice data bus in the timeslots associated with the respective voice signal processor.

7. Method according to claim 6, wherein the voice signal data transmitted in split form to a voice signal processor via the voice data bus in the associated timeslots are compiled in the respective voice signal processor to form voice data packets.

8. Method according to claim 1, wherein the voice data bus is a PCM bus.

9. Method according to claim 8, wherein the at least one voice signal processor is connected to the PCM bus by means of an associated PCM driver circuit.

10. Method according to claim 1, in which the voice data packets are transmitted via the voice data bus in HDLC frames.

11. Method according to claim 5, wherein the buffer-stored voice signal data from a subscriber port are processed by the voice signal processor.

12. Method according to claim 11, wherein the voice signal data received from a subscriber port and processed are packed by the voice signal processor into voice data packets and these voice data packets are transmitted in split form to the network processor via the voice data bus in the timeslots associated with the voice signal processor.

13. Method according to claim 12, wherein the voice signal data transmitted in split form in the timeslots associated with a voice signal processor are compiled in the network processor to form voice data packets from the respective voice signal processor.

14. Subscriber linecard for connecting subscriber terminals to a data network having:
   a) a network processor which is connected to the data network by means of a network interface;
   b) at least one voice signal processor for voice signal processing, where the at least one voice signal processor comprises at least one digital signal processor configured to generate signaling systems, compensate for echo signals and perform data compression operations and where the at least one digital signal processor is connected in parallel to the subscriber terminals via subscriber ports;
   c) at least two busses connected between the network processor and the at least one voice signal processor for transmission of telephone data:
      i) a control bus used to transmit control signals for setting up telephone connections between subscriber terminals; and
      ii) a voice data bus, processor signal processor, and being separated from the control bus, for transmitting voice data packets, where the voice data packets are transmitted in split form in multiple time-division multiplex data frames which each have a predetermined number of timeslots, where timeslots intended for the at least one voice signal processor are provided within the multiple time-division multiplex data frames, and where the voice data packets each comprise a payload of voice data having a variable scope or volume.

15. Subscriber linecard according to claim 14, wherein the voice data bus is a PCM data bus.

16. Subscriber linecard according to claim 14, wherein the voice signal processor is connected to the PCM data bus via a PCM driver.

17. Subscriber linecard according to claim 14, wherein the data network is the Internet.

18. Subscriber linecard according to claim 14, wherein each subscriber port has an SLIC circuit for connecting a telephone terminal.

19. Subscriber linecard according to claim 18, wherein each subscriber port has an analog/digital converter for converting an analog voice signal into voice data, and a digital/analog converter for converting voice data into an analog voice signal.

* * * * *